Patented Mar. 7, 1933

1,900,365

UNITED STATES PATENT OFFICE

ERICH RIETZ AND WILHELM HOFFMANN, OF ELBERFELD, GERMANY, ASSIGNORS TO GENERAL ANILINE WORKS, INC., OF NEW YORK, N. Y., A CORPORATION OF DELAWARE

CONDENSATION PRODUCT FROM ALIPHATIC ALDEHYDES AND BASES OF THE NAPHTHALENE SERIES

No Drawing. Application filed May 9, 1929. Serial No. 361,840.

The present invention relates to a process of manufacturing condensation products from aliphatic aldehydes and alpha naphthylamine and to new products obtainable thereby.

It is known that many condensation products which are obtainable by condensing an aliphatic aldehyde with a base of the naphthalene series in the presence or absence of a suitable acid are useful anti-oxidants, i. e., substances which are able to prevent deterioration of rubber goods due to age. These products form resin-like masses of unpleasant odor, easily soluble in alcohol.

We have found that new anti-oxidants forming finely powdered and odorless substances are obtainable by reacting upon alpha-naphthylamine with an aliphatic aldehyde, especially acetaldehyde, crotonaldehyde and aldol, in the presence of a suitable acid and of a water-soluble alcohol and by treating the alcohol insoluble resinous masses which are at first formed with hot water.

We prefer to perform the reaction by dissolving the reaction components, i. e., the aliphatic aldehyde and the alpha-naphthylamine in a water-soluble alcohol, such as methyl-, ethyl-, isopropyl-alcohol, or the like, adding a suitable organic or inorganic acid such as hydrochloric acid, benzene sulfonic acid, formic acid, acetic acid, butyric acid, crotonic acid, phenylacetic acid, benzoic acid and the like, and heating the reaction mixture, preferably to boiling, until no more of the reaction product which is formed separates. The amount of acid to be applied may vary within wide limits. Generally rather small amounts, say about ½–3% by weight (calculated on the alpha naphthylamine employed) will yield the best results, but also considerably larger amounts will be operative in most cases.

The resinous masses, thus obtainable, are freed from the alcohol acid mixtures, for example, by siphoning off the latter, washing the residue with alcohol and then treating it with hot water, whereby it changes to a powdery mass which is filtered by suction, washed with water and alcohol and then dried. The products, thus obtainable, form light yellow to brownish-red odorless powders of rather high melting points, (most of them melt between about 190–210° C.) nearly insoluble in alcohol. Compared with the known condensation products of aliphatic aldehydes with bases of the naphthalene series mentioned above, our new products have the advantage that in consequence of their powder-form they can more easily and homogeneously be rolled or kneaded into rubber goods. A further advantage of our new products is that they are odorless and in consequence do not lend any unpleasant odor to the rubber goods to which they are added, furthermore, these rubber goods are stable to light.

It may be mentioned that it is not necessary to start from the pure aldehydes, but that also mixtures of the same, such as technical aldol, containing aldol and acetaldehyde yield powdery and odorless products of pronounced anti-oxidant action. Also it is not necessary to start with equal molecular quantities of the reaction components, but the best results are generally obtained, when using one molecular weight of the aldehyde for each molecular weight of alpha-naphthylamine.

The following examples illustrate our invention without limiting it thereto, the parts being by weight:

*Example 1.*—120 parts of alpha-naphthylamine are dissolved in 450 parts of ethyl alcohol and to this solution 2 parts of formic acid and 73 parts of technical aldol (consisting of about 55% of aldol and 45% of acetaldehyde) are added. The reaction mixture is heated for about 6 hours to boiling under reflux until no more of a resin-like mass separates. Now the alcohol is removed by siphoning off. The residue is washed with a little alcohol and boiled up with water, whereby it changes to a pale yellow powder which is sucked off, washed with alcohol and dried. It can be milled in a disintegrator to a fine dusty powder. The product which is completely odorless is very difficultly soluble in water, alcohol and petrol ether, easily soluble in acetic acid ester, benzene, ether, acetone and glacial acetic acid. It melts at about 210° C.

*Example 2.*—120 parts of alpha-naphthylamine are dissolved in 500 parts of methyl alcohol to which solution two parts of formic acid and 80 parts of pure adol are added. The reaction mixture is boiled under reflux for about 6-7 hours, after which the methyl alcohol is siphoned off while still hot and the resinous residue is boiled up with water. A pale yellowish powder is thus obtained, which is difficultly soluble in alcohol, easily soluble in benzene.

Instead of methyl alcohol, other water-soluble alcohols, such as, for example, isopropylalcohol, can be used in this example with the same effect.

*Example 3.*—120 parts of alpha-naphthylamine, 74 parts of acetaldehyde, 2 parts of formic acid and 450 parts of ethyl alcohol are boiled together under reflux for about 6 hours. From the resinous mass, thus obtained, the alcohol is siphoned off while hot and hot water is added. There results a fine yellowish powder of similar properties as the product described in Example 2. It melts at about 215° C.

*Example 4.*—60 parts of alpha-naphthylamine are dissolved in 230 parts of ethyl alcohol to which solution 1 part of formic acid and 30 parts of crotonaldehyde are added. The reaction mixture is boiled under reflux for several hours, after which the alcohol is removed by decanting and the residue is treated with hot water. There results a yellowish powder difficultly soluble in alcohol, melting at about 190° C.

Instead of formic acid other suitable acids such as acetic acid, oxalic acid, hydrochloric acid and the like can be used with the same effect.

We claim:

1. In the process of preparing new antioxidants, the step which comprises heating alpha-naphthylamine with an aldehyde of the group consisting of acetaldehyde, crotonaldehyde and aldol in the presence of an acid and of a water-soluble alcohol until the reaction product has separated.

2. In the process of preparing new antioxidants, the step which comprises heating alpha-naphthylamine with an aldehyde of the group consisting of acetaldehyde, crotonaldehyde and aldol in the presence of a water-soluble alcohol and of an acid of the formula:

$$x \cdot COOH$$

wherein $x$ means hydrogen or methyl, until the reaction product has separated.

3. In the process of preparing new antioxidants, the step which comprises heating alpha-naphthylamine with an aldehyde of the group consisting of acetaldehyde, crotonaldehyde and aldol in the presence of an alcohol of the formula:

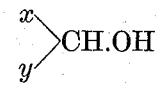

wherein $x$ and $y$ stand for hydrogen or methyl, and of an acid of the formula:

$$x \cdot COOH$$

wherein $x$ means hydrogen or methyl, until the reaction product has separated.

4. In the process of preparing new antioxidants, the step which comprises heating alpha-naphthylamine with aldol in the presence of an alcohol of the formula:

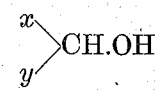

wherein $x$ and $y$ stand for hydrogen or methyl, and of an acid of the formula:

$$x \cdot COOH$$

wherein $x$ means hydrogen or methyl, in an amount between about ½-3% by weight of the naphthylamine applied, until the reaction product has separated.

5. In the process of preparing a new antioxidant, the step which comprises boiling together 120 parts by weight of alpha-naphthylamine, 450 parts by weight of ethyl alcohol, 2 parts by weight of formic acid and 37 parts by weight of technical aldol for about 6-7 hours.

6. The process which comprises heating alpha-naphthylamine with an aldehyde of the group consisting of acetaldehyde, crotonaldehyde and aldol in the presence of an acid and of a water-soluble alcohol, until the reaction product has separated, removing the alcohol and treating the residue with hot water.

7. The process which comprises heating alpha-naphthylamine with an aldehyde of the group consisting of acetalahyde, crotonaldehyde and aldol in the presence of a water-soluble alcohol and of an acid of the formula $$x \cdot COOH$$

wherein $x$ means hydrogen or methyl, until the reaction product has separated, removing the alcohol and treating the residue with hot water.

8. The process which comprises heating alpha-naphthylamine with an aldehyde of the group consisting of acetaldehyde, crotonaldehyde and aldol in the presence of an alcohol of the formula:

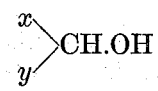

wherein $x$ and $y$ stand for hydrogen or methyl, and of an acid of the formula:

$$x \cdot COOH$$

wherein $x$ means hydrogen or methyl, until the reaction product has separated, removing the alcohol and treating the residue with hot water.

9. The process which comprises heating alpha-naphthylamine with aldol in the presence of an alcohol of the formula:

$$\genfrac{}{}{0pt}{}{x}{y}\!\!\!\searrow\!\! CH.OH$$

wherein $x$ and $y$ stand for hydrogen or methyl, and of an acid of the formula:

$$x \cdot COOH$$

wherein $x$ stands for hydrogen or methyl, in an amount between about ½–3% by weight of the naphthylamine applied, until the reaction product has separated, removing the alcohol and treating the residue with hot water.

10. Process which comprises boiling together 120 parts by weight of alpha-naphthylamine, 450 parts by weight of ethyl alcohol, 2 parts by weight of formic acid and 73 parts by weight of technical aldol for about 6–7 hours, siphoning off the alcohol and boiling up the residue with water.

11. The products being obtainable according to the process claimed in claim 6, said products being light yellow to brownish-red odorless powders of rather high melting points nearly insoluble in alcohol, being useful means for protecting rubber goods against deterioration due to age.

12. The products being obtainable according to the process claimed in claim 8, said products being light yellow to brownish-red odorless powders of rather high melting points nearly insoluble in alcohol, being useful means for protecting rubber goods against deterioration due to age.

13. The product being obtainable according to the process claimed in claim 10, said product being a yellowish powder difficultly soluble in alcohol, easily soluble in benzene, being a useful agent for protecting rubber goods against deterioration due to age.

In testimony whereof we have hereunto set our hands.

ERICH RIETZ. [L. S.]
WILHELM HOFFMANN. [L. S.]